(12) United States Patent
Balu et al.

(10) Patent No.: US 11,537,924 B2
(45) Date of Patent: Dec. 27, 2022

(54) SYSTEMS AND METHODS FOR RECONSTRUCTING A TRAJECTORY FROM ANONYMIZED DATA

(71) Applicant: HERE Global B.V., Eindhoven (NL)

(72) Inventors: Raghavendran Balu, Eindhoven (NL); Arash S Ostadzadeh, Nuenen (NL)

(73) Assignee: HERE Global B.V., Eindhoven (NL)

( * ) Notice: Subject to any disclaimer, the term of this patent is extended or adjusted under 35 U.S.C. 154(b) by 379 days.

(21) Appl. No.: 16/803,385

(22) Filed: Feb. 27, 2020

(65) Prior Publication Data

US 2021/0271995 A1 Sep. 2, 2021

(51) Int. Cl.
*G06F 21/00* (2013.01)
*G06N 7/00* (2006.01)
*G06N 20/00* (2019.01)
*G06F 21/62* (2013.01)

(52) U.S. Cl.
CPC ......... *G06N 7/005* (2013.01); *G06F 21/6254* (2013.01); *G06N 20/00* (2019.01)

(58) Field of Classification Search
CPC .... G06N 7/005; G06N 20/00; G06F 21/6254; G01C 21/3492; G01S 5/0252
See application file for complete search history.

(56) References Cited

U.S. PATENT DOCUMENTS

| | | |
|---|---|---|
| 2016/0150361 A1 | 5/2016 | Zhu et al. |
| 2018/0345958 A1 | 6/2018 | Lo |
| 2018/0302413 A1 | 10/2018 | Chakraborty et al. |
| 2019/0303475 A1* | 10/2019 | Jindal ..................... G06N 5/003 |
| 2020/0019921 A1* | 1/2020 | Bui .......................... G01S 17/08 |
| 2021/0165911 A1* | 6/2021 | Huang .................. G06F 16/906 |
| 2021/0325192 A1* | 10/2021 | Carbune ............ G01C 21/3476 |

FOREIGN PATENT DOCUMENTS

CN 110348560 A 10/2018

OTHER PUBLICATIONS

Mozhgan et al, OD-Matrix Extraction based on Trajectory Reconstruction from Mobile Data, 2019 (Year: 2019).*
A.Y. Xue et al. ("Destination Prediction by Sub-Trajectory Synthesis and Privacy Protection Against Such Prediction", ICDE '13: Proceedings of the 2013 IEEE International Conference on Data Engineering, Apr. 2013, pp. 254-265).

(Continued)

*Primary Examiner* — Ghazal B Shehni
(74) *Attorney, Agent, or Firm* — Jeffrey R. Moisan; HERE Global B.V.

(57) ABSTRACT

Systems and methods for reconstructing a trajectory from anonymized data are provided. In some aspects, a method includes receiving anonymized data corresponding to a trajectory of a user or object, and assembling, based on the anonymized data, a state-space model. The method also includes executing a prediction algorithm, based on the state-space model, to generate predicted data from the anonymized data, and reconstructing the trajectory of the user or object using the predicted data. The method further includes generating a report indicative of the trajectory.

12 Claims, 10 Drawing Sheets

(56) References Cited

OTHER PUBLICATIONS

P.P. Choi et al. ("Learning and Predicting Moving Object Trajectory: a piecewise trajectory segment approach," Tech. Report, CMU-RI-TR-06-42, Robotics Institute, Carnegie Mellon University, Aug. 2006).
L. Bindschaedler ("Track Me If You Can: on the Effectiveness of Context-based Identifier Changes in Deployed Mobile Networks," 19th Annual Network & Distributed System Security Symposium (NDSS), San Diego, California, USA, Feb. 5-8, 2012).
G. Trajcevski ("Computing with Spatial Trajectories", ISBN 978-1-4614-1628-9, Springer, New York, pp. 63-107, 2011).
H. Jeung et al. ("Path prediction and predictive range querying in road network databases", The VLDB Journal, vol. 19, pp. 585-602, 2010).
European Search Report for European Application No. 21159728.1, dated Jul. 9, 2021, 8 pages.
Zheng Yu Yuzheng@Microsoft Com: "Trajectory Data Mining", ACM Transactions on Intelligent Systems and Technology, Association for Computing Machinery Corporation, 2 Penn Plaza, Suite 701 New York NY 10121-0701 USA, vol. 6, No. 3, May 12, 2015 (May 12, 2015), pp. 1-41, XP058493758, ISSN: 2157-6904, DOI: 10.1145/2743025.
Sriram N Net al: "SMART: Simultaneous Multi-Agent Recurrent Trajectory Prediction", May 12, 2015 (May 12, 2015), Advances in Intelligent Data Analysis XIX; [Lecture Notes in Computer Science; Lect.Notes Computer], pp. 463-479, XP047594085, ISSN: 0302-9743 ISBN: 978-3-030-71592-2.
European Search Report for European Application No. 21159741.4, dated Jul. 9, 2021, 9 pages.
Nikolay Vyahhi et al: "Tracking Moving Objects in Anonymized Trajectories", Sep. 1, 2008 (Sep. 1, 2008), Database and Expert Systems Applications; [Lecture Notes in Computer Science], Springer Berlin Heidelberg, Berlin, Heidelberg, pp. 158-171, XP019103768, ISBN: 978-3-540-85653-5 * chapter 2, 1st paragraph, chapter 4.2, paragraphs 1-3, chapter 4.3, chapter 5, paragraphs 2, 3 and 5, figs. 3 and 8.
Terrovitis Manolis et al: "Local Suppression and Splitting Techniques for Privacy Preserving Publication of Trajectories", IEEE Transactions on Knowledge and Data Engineering, IEEE Service Centre , Los Alamitos , CA, US, vol. 29, No. 7, Jul. 1, 2017 (Jul. 1, 2017), pp. 1466-1479, XP011651527, ISSN: 1041-4347, DOI: 10.1109/TKDE.2017.2675420 [retrieved on Jun. 2, 2017] * chapter I: "Introduction".
Wen Jin et al: "An online framework for publishing privacy-sensitive location traces", Data Engineering for Wireless and Mobile Access, ACM, 2 Penn Plaza, Suite 701 New York NY 10121-0701 USA, Jun. 6, 2010 (Jun. 6, 2010), pp. 1-8, XP058163894, DOI: 10.1145/1850822.1850824 ISBN: 978-1-4503-0151-0 * chapter 1.1, chapter3.1.
Francesco Bonchi et al: Trajectory anonymity in publishing personal mobility data, ACM SIGKDD Explorations Newsletter, vol. 13, No. 1, Aug. 31, 2011 (Aug. 31, 2011), p. 30, XP055537577, US ISSN: 1931-0145, DOI: 10.1145/2031331.2031336 * abstract, chapter 4.2.

* cited by examiner

SYSTEMS AND METHODS FOR RECONSTRUCTING A TRAJECTORY FROM ANONYMIZED DATA

BACKGROUND

The present disclosure relates generally to privacy, and more specifically to systems and methods for reconstructing a trajectory from anonymized data.

The Global Positioning System (GPS), and other global navigation satellite systems (GNSS), provide location information anywhere on Earth. Consumer devices, such smartphones, tablet computers, personal digital assistants (PDAs), personal navigation devices (PNDs), in-vehicle navigation systems, vehicle control systems, advanced driver assistance systems (ADASs), and others, are increasingly adopting GPS technologies. Such "probe" devices can generate a large pool of location data, including stay-points, check-ins, and mobility traces or trajectories. When aggregated, location data can be used for traffic analysis and prediction, fleet management, point-of-interest recommendations, location-based services (LBS), and so on.

Data owners often collect and share location data, which may be represented as sequences of time-stamped geographical coordinates corresponding to user or probe device positions (i.e. "probe points") as they traverse various routes. Although such data publication can be useful for urban planning, intelligent vehicles, logistics, and other applications, it risks revealing personal and sensitive information, and reduces control over how the data is used. For instance, mobility traces or trajectories indicate the movement patterns of users, which can jeopardize their safety and security. As a result, various anonymization methods have been developed to help protect the identity of its contributing users. However, conventional anonymization techniques are naive, and often not sufficiently robust for safe publishing. This allows malicious adversaries to access information about contributing users from the published data.

The level of sophistication of attacks aiming to exploit data vulnerabilities is growing. Accordingly, data owners, data aggregators and content providers face mounting challenges for protecting data privacy, and need improved approaches for evaluating the vulnerability of anonymized data.

SUMMARY

The present disclosure overcome the shortcomings of prior technologies. In particular, a novel approach for reconstructing a trajectory from anonymized data is provided.

In accordance with aspect of the disclosure, a method for reconstructing a trajectory from anonymized data is provided. The method includes receiving anonymized data corresponding to a trajectory of a user or object along a road network, and assembling, based on the anonymized data, a state-space model having a state representation that corresponds to the road network. The method also includes executing a discrete prediction algorithm, based on the state-space model, to generate predicted data from the anonymized data, and linking the predicted data to reconstruct the trajectory of the user or object. The method further includes generating a report indicative of the trajectory.

In accordance with another aspect of the disclosure, a system for reconstructing a trajectory from anonymized data is provided. The system includes at least one processor, and at least one memory comprising instructions executable by the at least one processor, the instructions causing the system to access anonymized data corresponding to a trajectory of a user or object along a road network, and assemble, based on the anonymized data, a state-space model having a state representation that corresponds to the road network. The instructions also cause the system to execute a discrete prediction algorithm, based on the state-space model, to generate predicted data from the anonymized data, link the predicted data to reconstruct the trajectory of the user or object, and generate a report indicative of the trajectory. The system further includes a display for providing the report.

In accordance with yet another aspect of the disclosure, a non-transitory computer-readable storage medium for reconstructing a trajectory from anonymized data is provided. The storage medium, carry one or more sequences of one or more instructions which, when executed by one or more processors, cause an apparatus to perform steps to access anonymized data corresponding to a trajectory of a user or object along a road network, and assemble, based on the anonymized data, a state-space model having a state representation that corresponds to the road network. The instructions also cause the apparatus to execute a discrete prediction algorithm, based on the state-space model, to generate predicted data from the anonymized data, link the predicted data to reconstruct the trajectory of the user or object, and generate a report indicative of the trajectory.

In accordance with yet another aspect of the disclosure, a method for reconstructing a trajectory from anonymized data is provided. The method includes receiving anonymized data corresponding to a trajectory traversed by a user or object, and assembling a state-space model having internal states that represent geographical coordinates of the trajectory. The method also includes, for a selected trajectory segment associated with the anonymized data, predicting future locations of the user or object using the state-space model and particle filtering, reconstructing the trajectory using the future locations, and generating a report indicative of the trajectory.

In accordance with another aspect of the disclosure, a system for reconstructing a trajectory from anonymized data is provided. The system includes at least one processor, and at least one memory comprising instructions executable by the at least one processor, the instructions causing the system to receive anonymized data corresponding to a trajectory traversed by a user or object, and assemble a state-space model having internal states that represent geographical coordinates of the trajectory. The instructions also cause the system to, for a selected trajectory segment associated with the anonymized data, predict future locations of the user or object using the state-space model and particle filtering, reconstruct the trajectory using the future locations, and generate a report indicative of the trajectory. The system further includes a display for providing the report.

In accordance with yet another aspect of the disclosure, a non-transitory computer-readable storage medium for reconstructing a trajectory from anonymized data is provided. The storage medium, carry one or more sequences of one or more instructions which, when executed by one or more processors, cause an apparatus to perform steps to receive anonymized data corresponding to a trajectory traversed by a user or object, and assemble a state-space model having internal states that represent geographical coordinates of the trajectory. The instructions also cause the apparatus to, for a selected trajectory segment associated with the anonymized data, predict future locations of the user or object using the state-space model and particle filtering, reconstruct the trajectory using the future locations, and generate a report indicative of the trajectory.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention will hereafter be described with reference to the accompanying figures, wherein like reference numerals denote like elements. The embodiments of the invention are illustrated by way of example, and not by way of limitation, in the accompanying drawings.

DETAILED DESCRIPTION

Location data can be captured using various location-tracking devices (e.g. cell phones, tablets, personal and fitness trackers, vehicle navigation devices, and so forth), and used to reveal patterns of movement or trajectories. For example, such patterns can benefit urban planners, government and regulatory bodies, fleet management services, and others. However, publication of user or device mobility has always been challenging because of the sensitive nature of location data, and the complexity of sound anonymization schemes to protect it.

To address this issue, some simple data anonymization methods have been developed. One particular approach takes user trajectories, substitutes identifications for the user trajectories with random pseudonyms, and returns new trajectories in which user information has been removed. However, personally identifiable information is characteristic to the location data itself. That is, even in the absence of other information, a subset of location coordinates may be sufficient to identify a user. Thus, more advanced anonymization methods are required.

Figure 1:
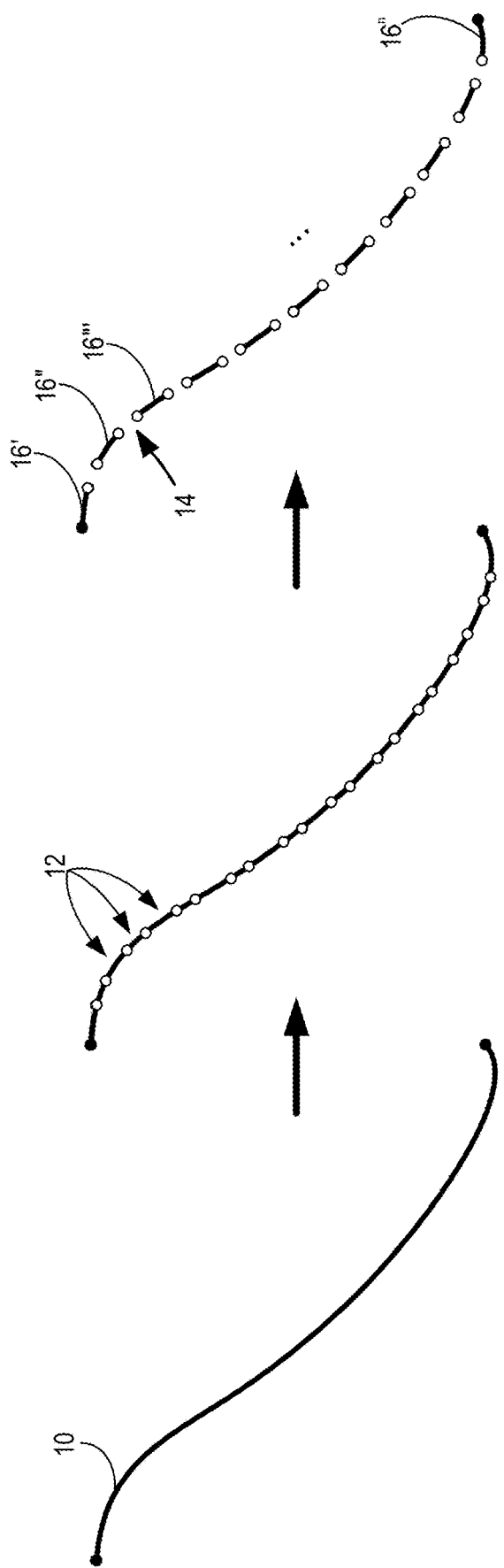
FIG. 1 is an illustration demonstrating a split-gap anonymization method, in accordance with aspects of the present disclosure.

Another common anonymization method is split-gap anonymization. In this technique, as illustrated in FIG. 1, trajectory data (i.e. mobility trace data) is anonymized by splitting a given trajectory 10 into trajectory segments 12, each including a sequence of geographical coordinates, and introducing gaps 14 by removing alternating trajectory segments 12. The trajectory segments need not be equal in duration. The remaining trajectory segments, 16', 16'', . . . , 16ⁿ, are separately assigned individual identifications (IDs). In one example, a trajectory may be anonymized by introducing gaps of approximately 2 minutes, and producing trajectory segments between approximately 2 minutes and 10 minutes in duration.

In principle, the split-gap approach can provide a good measure of security because linking together separated trajectory segments is difficult, and reconstructing the original trajectory is even more difficult. In practice, however, this anonymization scheme can fail, particularly in spatial regions and time periods where there is insufficient data (e.g. corner and sparse trajectory cases). Hence, privacy may not necessarily be guaranteed by using this approach.

To ensure adequate data protection, it is important to evaluate the adequacy of anonymization technique. For instance, split-gap anonymization can be parameterized using two variables, namely split condition and gap condition. And so, determining which the parameter values to use would help to achieve an optimal level of anonymization using this technique.

Conventionally, anonymization methods are evaluated by looking at individual characteristics of the anonymized data (e.g. by sampling), and applying various heuristic rules to determine the quality of the anonymization. However, heuristic approaches are typically non-rigorous, and can be problematic when the data density becomes large. As a result, other approaches have been devised, including adversary models that attempt to reconstruct anonymized data by modeling the actions of attackers. For example, adversary models for split-gap anonymization attempt to link back the separated trajectory segments of an anonymized trajectory by greedily stitching them together based on spatial distance and time duration. However, many such adversary models can be simplistic, informal, vague or ambiguous.

To address these problems in the field of data privacy and anonymization, the present disclosure introduces a novel solution. Specifically, systems and methods are provided herein for reconstructing a trajectory from anonymized data. In the present approach, a state-space framework is utilized to predict the location of a user or object (e.g. a user's device) at a future time point based a current location and location history. The predictive scheme may be exact, or approximate (e.g. based on sampling). Particularly with respect to split-gap anonymization, an anonymized trajectory may be reconstructed by repeatedly linking successive trajectory segments, for example, based on predictive scores associated with the trajectory segments. Among other applications, the success rate at which an anonymized data can be reconstructed using systems and methods described herein can be used to assess the quality or effectiveness of the anonymization and inform any risks or modifications required.

As appreciated from description below, the present disclosure affords a number of advantages. For instance, exposing information about user's mobility is often undesirable due to privacy concerns. As such, the present approach provides a stronger attack model to predict user or object mobility compared to conventional techniques. This allows for more reliable characterization and verification of protocols, systems and schemes related to data anonymization. In addition, the approach described is sufficiently flexible to include various information and clues, and integrate them into a unified model to improve the accuracy of prediction.

In what follows, and for the purposes of explanation, numerous specific details are set forth to provide a thorough understanding of the embodiments of the invention. It should be apparent to one skilled in the art, however, that the embodiments of the invention may be practiced with or without these specific details, or with equivalent arrangements. In other instances, well-known structures and devices are shown in block diagram form in order to avoid unnecessarily obscuring the embodiments of the invention.

Figure 2:
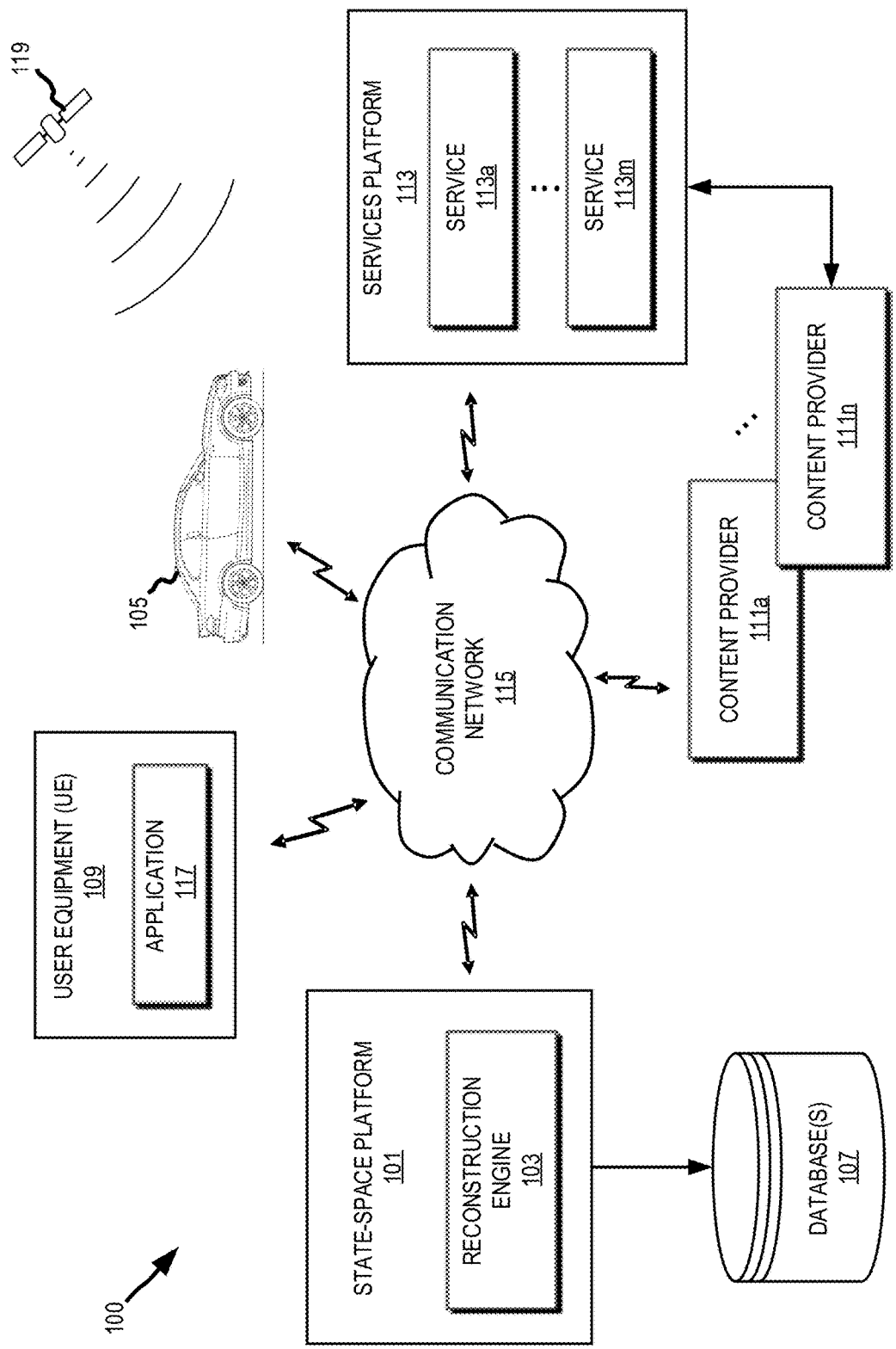
FIG. 2 is a diagram of an example system, in accordance with aspects of the present disclosure.

Referring particularly to FIG. 2, a schematic diagram of a system 100, in accordance with aspects of the present disclosure, is shown. In general, the system 100 may be any device, apparatus, system, or a combination thereof, that is configured to carry out steps for reconstructing a trajectory from anonymized data, in accordance with aspects of the present disclosure. The system 100 may include, be part of, or operate in collaboration with, various computers, systems, devices, machines, mainframes, networks, servers, databases, and so forth. In some embodiments, the system 100 may include portable or mobile devices, such as cellular phones, smartphones, laptops, tablets, and the like. In this regard, the system 100 may be designed to integrate a variety of hardware, software, and firmware, implemented in various forms and having various capabilities and functionalities. In addition, the system 100 may be capable of operating autonomously or semi-autonomously.

As shown in FIG. 2, in some embodiments, the system 100 may include a state-space platform 101. The state-space platform 101 may be configured to access, generate and process a variety of information and data, in accordance with aspects of the present disclosure. In addition, state-space platform 101 may also communicate and exchange information/data with various systems, devices and hardware. For instance, as shown in FIG. 2, the state-space platform 101 may communicate with one or more vehicle(s) 105, database(s) 107, user equipment (UE) 109, content provider(s) 111, and/or services platform(s) 113 by way of a communication network 115.

To carry out steps, in accordance with aspects of the present disclosure, the state-space platform 101, and components therein, may execute instructions stored in a non-transitory computer-readable medium (not shown in FIG. 2). The non-transitory computer-readable medium may be part of a memory, database, or other data storage location(s). The state-space platform 101, or components therein, may execute instructions using a programmable processor, or combination of programmable processors. Alternatively, or additionally, the state-space platform 101 may also utilize one or more dedicated processors, or processing units, modules or systems specifically configured (e.g. hardwired, or pre-programmed) to carry out steps, in accordance with methods described herein. In addition, the state-space platform 101 may further include, as well as share, a variety of interconnected components, including servers, intelligent networking/computing devices and other components, as well as corresponding software and/or firmware. By way of example, processing steps in accordance with aspects of the present disclosure may be carried out using any combination of central processing units (CPUs), graphics processing units (GPUs), Digital Signal Processing (DSP) chips, Application Specific Integrated Circuits (ASICs), Field Programmable Gate Arrays (FPGAs), and so forth.

In some embodiments, the state-space platform 101 may include a reconstruction engine 103, as illustrated in FIG. 2. The reconstruction engine 103 may be configured to receive/access anonymized data (e.g. user or device locations, mobility traces, trajectories, etc), and apply a state-space framework to the anonymized data to generate reconstructed data. By way of example, the reconstructed data may be indicative of locations, mobility traces, or trajectories of a user or object. The reconstruction engine 103 may also be configured to generate and provide other information based on the reconstructed data. For example, the reconstruction engine 103 may be configured to generate and provide feedback indicative of the quality or efficiency of anonymization (e.g. the anonymization applied to the anonymized data). In addition, the reconstruction engine 103 may generate various confidence values/uncertainties (e.g. confidence or uncertainty in a predicted location or trajectory of a user or object).

Although the reconstruction engine 103 is shown as being part of the state-space platform 101, it may be a stand-alone system or device. Alternatively, the reconstruction engine 103, or portions thereof, may be integrated in the vehicle 105, UE 109, services platform 113 or services 113a-m, or a combination thereof.

As shown in FIG. 2, the state-space platform 101 may have connectivity or access to at least one database 107. Specifically, the database(s) 107 may store a variety of data and information using various forms and formats. For instance, the database 107 may include device or probe data (e.g. geographical or location coordinates, timestamps, speed, heading, and so forth), road map data (e.g. network, geometry, class, free flow, average speed, and so forth), historical data (e.g. turn probabilities, speed profiles, and so forth). The database 107 may also include other data and information, including images or image data (e.g. terrestrial images, aerial images, maps and so forth).

In addition, the state-space platform 101 may also communicate with UE 109 and/or a vehicle 105. In one non-limiting example, the UE 109, or alternatively the vehicle 105, may execute an application 117 (e.g. a software application) configured to carry out steps in accordance with methods described here. In another non-limiting example, application 117 may also be any type of application that is executable on the UE 109 and/or vehicle 105, such as autonomous driving applications, mapping applications, location-based service applications, navigation applications, content provisioning services, camera/imaging application, media player applications, social networking applications, calendar applications, and the like. In yet another non-limiting example, the application 117 may act as a client for state-space platform 101, and perform one or more functions associated with reconstructing a trajectory from anonymized data, either alone or in combination with the state-space platform 101.

By way of example, the UE 109 may be, or include, an embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 109 may support any type of interface with a user (e.g. by way of various buttons, touch screens, consoles, displays, speakers, "wearable" circuitry, and other I/O elements or devices). Although shown in FIG. 2 as being separate from the vehicle 105, in some embodiments, the UE 109 may be integrated into, or part of, the vehicle 105.

In some embodiments, the UE 109 and/or vehicle 105 may include various sensors for acquiring a variety of different data or information. For instance, the UE 109 and/or vehicle 105 may include one or more camera/imaging devices for capturing imagery (e.g. terrestrial images), global positioning sensors (GPS) for gathering location or coordinates data, network detection sensors for detecting wireless signals, receivers for carrying out different short-range communications (e.g., Bluetooth, Wi-Fi, Li-Fi, near field communication (NFC) etc.), temporal information sensors, audio recorders for gathering audio data, velocity sensors, switch sensors for determining whether one or more vehicle switches are engaged, and others.

The UE 109 and/or vehicle 105 may also include light sensors, height sensors and accelerometers (e.g., for determining acceleration and vehicle orientation), tilt sensors (e.g. for detecting the degree of incline or decline), moisture sensors, pressure sensors, and so forth. Further, the UE 109 and/or vehicle 105 may also include sensors for detecting the relative distance of the vehicle 105 from a lane or roadway, the presence of other vehicles, pedestrians, traffic lights, potholes, and any other objects, or a combination thereof. Other sensors may also be configured to detect weather data, traffic information, or a combination thereof. Yet other sensors may also be configured to determine the status of various control elements of the car, such as activation of wipers, use of a brake pedal, use of an acceleration pedal, angle of the steering wheel, activation of hazard lights, activation of head lights, and so forth.

In some embodiments, the UE 109 and/or vehicle 105 may include GPS or other satellite-based receivers configured to obtain geographical coordinates from a satellite 119 (see FIG. 2) for determining current location and time. Further, the location can be determined by visual odometry, triangulation systems such as A-GPS, Cell of Origin, or other location extrapolation technologies.

The state-space platform 101 may also have connectivity with various content providers 111. Each content provider 111a-111n may send or provide access to various information or data to the reconstruction engine 103, vehicle 105, database 107, user equipment 109, the services platform 113, and any combination thereof. The content provided may include map content (e.g., geographic data, parametric representations of mapped features, and so forth), textual content, audio content, video or image content (e.g. terrestrial image data), and so forth. In some implementations, the providers 111 may exchange content with the state-space platform 101, vehicle 105, database 107, UE 109, and/or services platform 113. The content providers 111 may also manage access to a central repository of data, and offer a consistent, standard interface to data, such as a repository of the database 107.

As shown in FIG. 2, the state-space platform 101 may further connect over the communication network 115 to the services platform 113 (e.g. a third-party platform), which may provide one or more services 113a-m. By way of example, the services platform 113 may provide mapping services, navigation services, travel planning services, notification services, social networking services, content (e.g., audio, video, images, etc.) provisioning services, application services, storage services, contextual information determination services, location based services, information based services (e.g., weather, news, etc.), and so forth. In one embodiment, the services platform 113 may use the output of the reconstruction engine 103 (e.g., a predicted location or trajectory) to localize the vehicle 105 or UE 109 (e.g., a portable navigation device, smartphone, portable computer, tablet, etc.), and provide services such as navigation, mapping, other location-based services, and so forth.

The communication network 115 may include any number of networks, such as data networks, wireless networks, telephony networks, or combinations thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the state-space platform 101, reconstruction engine 103, vehicle 105, geographic database 107, UE 109, content provider 111, and services platform 113 may communicate with each other, and other components of the system 100, using various communication protocols. In this context, a protocol may include a set of rules defining how the network nodes within the communication network 115 interact with each other based on information and data sent over the communication links. The protocols may be effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information and data over a network are described in the Open Systems Interconnection (OSI) Reference Model.

Communications between the network nodes may be carried out by exchanging discrete packets of data. Each packet may comprise (1) header information associated with a particular protocol, and (2) payload information that follows the header information and contains information that may be processed independently of that particular protocol. In some protocols, the packet may include (3) trailer information following the payload and indicating the end of the payload information. The header may include information such as the source of the packet, its destination, the length of the payload, and other properties used by the protocol. The data in the payload for the particular protocol may include a header and payload for a different protocol associated with a different, higher layer of the OSI Reference Model. The header for a particular protocol may indicate a type for the next protocol contained in its payload. The higher layer protocol is said to be encapsulated in the lower layer protocol. The headers included in a packet traversing multiple heterogeneous networks, such as the Internet, may include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3:
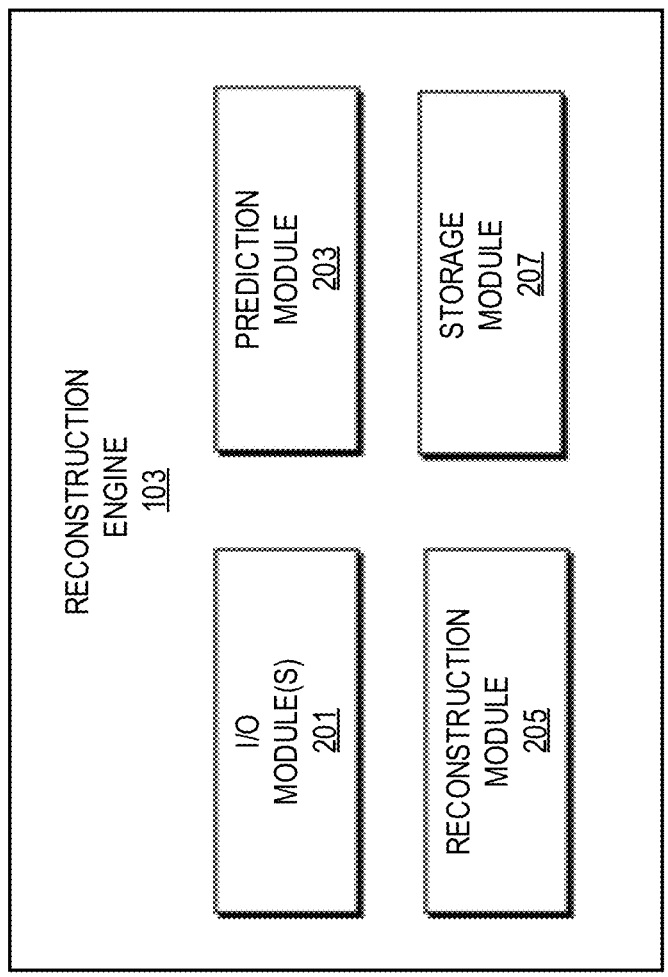
FIG. 3 is a diagram of an example reconstruction engine of the system in FIG. 2.

Referring now to FIG. 3, a schematic diagram of an example reconstruction engine 103, in accordance with aspects of the present disclosure, is illustrated. In some embodiments, the reconstruction engine 103 may include various input/output (I/O) modules 201, a prediction module 203, a reconstruction module 205, a storage module 207, and possibly others. The modules can be implemented using various hardware, firmware, software, as described with reference to the state-space platform 101 in FIG. 2. Alternatively, or additionally, modules may also be implemented as a cloud-based service, local service, native application, or combination thereof. Although not shown, the reconstruction engine 103 may also include various means of communication between its respective modules, including various communication hardware, buses, networks, and so forth.

The I/O modules 201 may include various input and output elements for receiving and relaying various data and information. Example input elements may include a mouse, keyboard, touchpad, touchscreen, buttons, and other user interfaces configured for receiving various selections, indications, and operational instructions from a user. Input elements may also include various drives and receptacles, such as flash-drives, USB drives, CD/DVD drives, and other computer-readable medium receptacles, for receiving various data and information. Example output elements may include displays, touchscreens, speakers, LCDs, LEDs, and so on. In addition, I/O modules 201 may also include various communication hardware configured for exchanging data and information with various external computers, systems, devices, machines, mainframes, servers or networks, for instance.

In some embodiments, as shown in the example of FIG. 3, the reconstruction engine 103 of FIG. 2 may include a prediction module 203 and reconstruction module 205 configured to carry out steps, in accordance with aspects of the present disclosure. Specifically, the prediction module 203 may carry out prediction algorithms (e.g. discrete or continuous) that receive or access anonymized data by way of the I/O modules 201, and apply a state-space framework to generate predicted data (e.g. location or trajectory at a future time point), as described below. The reconstruction module 205 may then receive the predicted data, and generate reconstructed data (e.g. user or object trajectory). In some aspects, the prediction module 203 and/or the reconstruction module 205 may be configured to generate scores based on probabilities for transition between various trajectory segments, or portions thereof, of an anonymized trajectory, and link corresponding trajectory segments based on their respective scores and durations. In some implementations, the probabilities of transition may be computed based on historical data, such as individual and aggregate information related to vehicles or objects passing through the various trajectory segments, or portions thereof. In one non-limiting example, the probabilities of transition may be computed based on the number of vehicles passing through a link, or taking a turn towards a link, in a given time period, and normalized by the total of vehicles passing through the region associated with that link.

In some implementations, the reconstruction engine 103, by way of the prediction module 203, or reconstruction module 205, or both, may generate other data and information. For instance, the reconstruction engine 103 may generate and provide a report using the I/O modules 201. For instance, the report may include, various predictions for locations, trajectories or trajectory segments of a user or object, as well as confidence values, uncertainties, or probability scores corresponding to such locations, trajectories or trajectory segments. In some aspects, the report may also indicate the quality or efficiency of data anonymization. To this end, the reconstruction engine 103 may also be configured to compute the rate of success, accuracy, or other index characterizing the reconstruction of the anonymized data. For example, raw data (e.g. trajectory data that is not anonymized) may selected to be a "ground truth," and anonymized using a split-gap technique. IDs may be stored later for verification. The anonymized data may then be processed by the reconstruction engine 103, in accordance with methods described herein, to link the data back together. The rate of success of the reconstruction process may then be obtained by calculating the fraction of trajectory segments that are correctly reconstructed (as verified using ground truth labels) to the total number of trajectory segments provided to the reconstruction engine 103.

Although the modules in FIG. 3 are shown as separate components of the reconstruction engine 103, it is contemplated that their respective functions may be readily combined into fewer modules, or further separated into more modules.

In general, state-space techniques attempt to model the evolution of states of a system based on a sequence of observations. The inherent stochasticity makes such approaches robust to noise and missing information. In recognizing these and other advantages of state-space modeling, the present disclosure introduces and applies a state-space framework for reconstructing a trajectory from anonymized data. In this framework, the location coordinates, along with timestamps and optionally additional metadata (e.g. speed, heading and so forth), of a user or object (e.g. a location-tracking device) may represent the internal state, while the observations may represent anonymized coordinates (i.e. anonymized data) that are publicly available. The objective then becomes to estimate or predict the coordinates of the object at a current or future time point based on the anonymized coordinates, as well as other observations. The present state-space framework is described in more detailed below.

State Representation:

The present disclosure envisions that a state-space model may represent internal state(s) in two different ways. A first variation may use a discrete state representation. For instance, a road network may be used to build a discrete set of states that are interconnected. The second variation may use a continuous state representation in which object location may be modeled a real scale using geographical coordinates. As appreciated from description below, the representation of states can determine the prediction accuracy and the complexity of the model. For instance, a large number of states might provide a precise location, but would increase time to make the prediction. Also, a larger number of states might require more historical data to achieve better generalization capabilities.

In some aspects, the prediction accuracy may be increased by integrating other information/data and clues into the state-space models. For example, such information may include probe properties (e.g. location or geographical coordinates, timestamps, speed, heading, and so forth), road map properties (e.g. network, geometry, class, free flow, average speed, and so forth), historical dataset properties (e.g. turn probabilities, speed profiles, and so forth), anonymization technique (e.g. gap duration, split duration, and so forth), and other information. This may be achieved by considering such information as part of the observation.

Prediction:

The prediction algorithms described herein may use the state representation to assign a probability score to each of the possible states, indicating how likely it is for a tracked object to be in such states. Since the prediction algorithms, discrete or continuous, are directly tied to the underlying state representation, they are described together in the following.

Discrete Network Based State and Enumerated Prediction:

In some aspects, the state representation may use an underlying road network, for example, modeled as a directed graph or using a map. In a directed graph, roads correspond to edges or links, and intersections correspond to vertices or nodes. In some aspects, the directed graph may be represented as a matrix (e.g. a sparse adjacency matrix) with nodes as rows, and columns as edges. For each trajectory segment of an anonymized trajectory, or a portions thereof, the discrete prediction algorithm may generate and utilize probability scores to identify the next likely trajectory segment, or portion thereof, along the road network. Computed probability scores may correspond to a likelihood of transitioning between two or more links along the road network. For instance, a probability score may represent the likelihood of reaching one link (e.g. link B) from another link (e.g. link A) after a predetermined duration or at a future time point. In some aspects, a sequence of transitions between various links along a path may be used to calculate the likelihood. In one non-limiting example, for a path A-B-C that includes links A, B, and C arranged in succession, the probability of transition between links A and B, and the probability of transition between links B and C, may be multiplied together to determine the likelihood of transition between links A and C. In another non-limiting example, two paths may connect links W and Z, namely by path W-X-Z and by path W-Y-Z, In this case, the aggregate likelihood of transition between link W and link Z may be computed by adding the likelihood along path W-X-Z and the likelihood along path W-Y-Z, each likelihood computed as described above. Of course, paths with fewer or more links, and arranged in various configurations may be possible. Also, this approach may be used to model the possibility of traveling between roads connected by an intersection. The probability scores may be normalized across all possible roads, or road links, connected to that intersection. In some implementations, the speed profile of each road in the road network may be stored and accessed. The speed profile may include maximum speed, free flow speed, average speed across time and with respect to discrete time intervals. In some aspects, the transition probabilities and speed profiles may be estimated from historical data and other data sources, such as speed lookups. These parameters can then provide an estimate for the probability of reaching a point B from a point A on a road network.

Figure 4C:
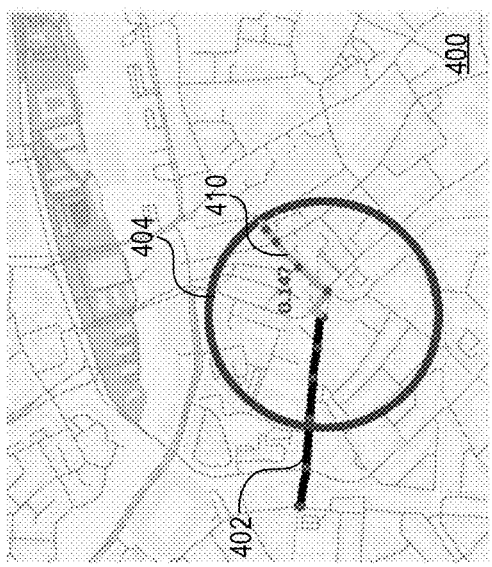
FIGS. 4A-4C are graphical illustrations showing steps of a discrete prediction algorithm, in accordance with aspects of the present disclosure.
Figure 4B:
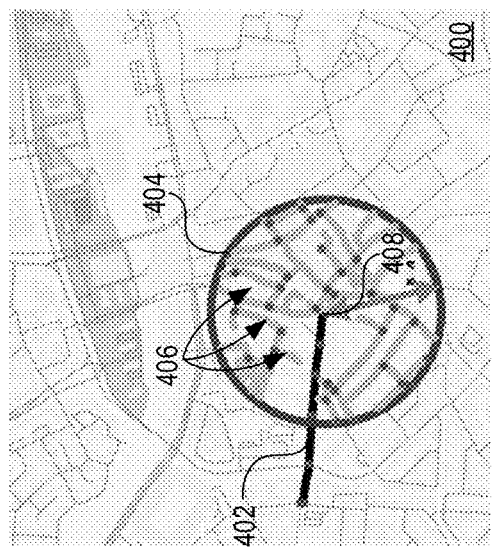
Figure 4A:
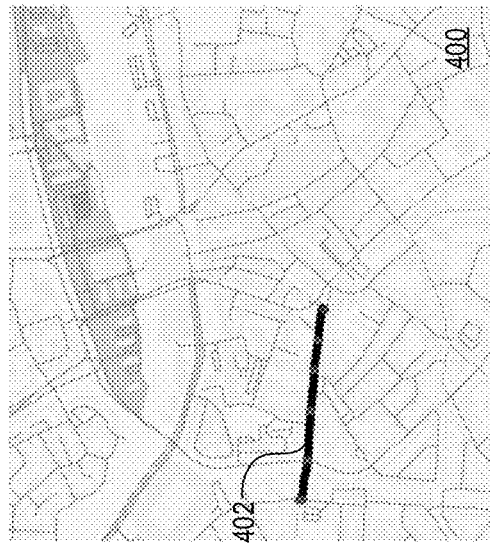

A discrete prediction algorithm, in accordance with aspects of the present disclosure, is illustrated in the example of FIGS. 4A-4C. Specifically, the algorithm may begin by receiving or accessing anonymized data (e.g. trajectory data) of a user or object, and matching the data to a map. This is because trajectory segments, which often include noisy observations (i.e. geographical coordinates), might not necessarily have a one-to-one correspondence to specific links on a given map. And so, each trajectory segment can be matched to their corresponding links. With specific reference to the example shown in FIG. 4A, the prediction algorithm map matches a trajectory segment 402 to a road network 400 to obtain the links in the road network 400 to which the trajectory segment 402 corresponds. The algorithm may also obtain a future time point for which the prediction would be carried out by the algorithm. In some aspects, the future time point may be provided by a user or pre-defined. For example, if the gap interval variable of the anonymization is 2 minutes, then +2 minutes may be selected or defined to be the future time point. Then the algorithm may obtain a maximum speed based on the speed profile of the user or object. The speed profile may include speeds along a current link, or speeds along links adjacent to the current link, or speeds throughout the trajectory segment 402 or other portions of the trajectory. To optimize prediction accuracy, the maximum speed may be selected based on the highest speed in the speed profile.

The maximum distance reachable by the object may then be computed based on the maximum speed and duration between the last known timestamp of the object along the trajectory segment 402, and a future timestamp (e.g. future time point for which the prediction is carried out). Such maximum distance can then be used to define a region 404 in the road network 400 that is accessible by object at the point in time reflected by future timestamp, as shown in FIG. 4B.

The prediction algorithm may then identify and filter out links 406 that fall within the region 404 of the road network 400. To this end, a search and scoring of the links 406 may be performed by the algorithm. In some implementations, the search may be incremental, beginning with links immediate to the last known timestamp, followed by links connected thereto, and so forth. Link scoring may be based on several factors, including transition probabilities between the links 406, and durations of the links 406. For instance, for given a link within the region 404, a transition probability represents the probability of transitioning to the next link in the region 404, while the duration is the expected time spent in the link (e.g. based on the speed profile and distance associated with the link). In some implementations, the transition probabilities are computed using historical data. In scoring each link in the region 404, an accumulated transition probability is computed by multiplying probabilities of transition between links 406 along the path from the origin link 408 (FIG. 4B) to the link. In some aspects, an accumulated duration may also be computed for each respective link by summing durations along the path from the origin link 408 to the link. A probability score may then be calculated for each link by multiplying together the accumulated transition probability and accumulated duration. Alternatively, or additionally, the score may be based only on the accumulated transition probability.

By sorting probability scores corresponding to each of the links 406, and filtering the links 406 based on the scores, the most probable path following the trajectory segment 402, namely the next trajectory segment 410, may be obtained or synthesized. In some aspects, the most probable path for a user or object may be computed by multiplying the transition probabilities at every intersection within the region 404, and ranking based on the product. For example, given a link at an intersection in the region 404, transition probabilities for each link connected to that link are multiplied together. The most probably path may then follow the maximum product of transition probabilities.

Figure 5A:
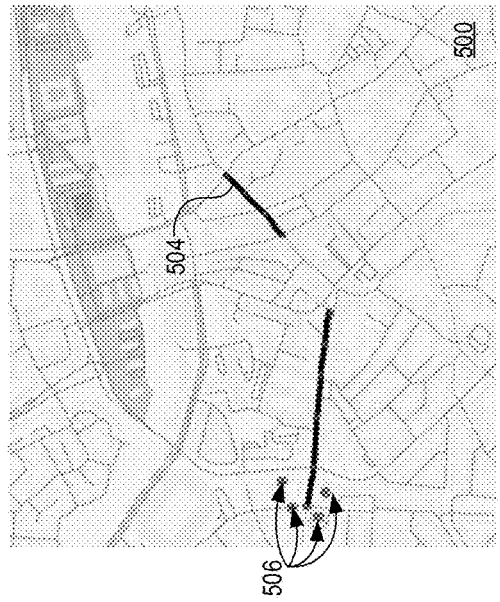
FIGS. 5A-5D are graphical illustrations showing steps of a continuous prediction algorithm, in accordance with aspects of the present disclosure.

Continuous State and Sampling-Based Prediction:

As described, a continuous state may be used to represent a predicted location in terms of geographical coordinates in real scale. A predictive algorithm based on a particle filtering approach may then be executed to identify future locations of the user or object, or determine missing points or segment between adjacent trajectories, or trajectory segment (as shown in FIG. 5A). To note, and unlike the discrete approach, geographical coordinates in real scale may not be efficiently and exhaustively searched. Hence, in some aspects, a sampling-based approach may be utilized to provide improved efficiency (e.g. sequential Monte Carlo family of methods). For example, a Sequential Importance Resampling (SIR), which is special case of importance sampling, may be used. In particular, particle filters use a set of sampled points, potentially closer state to the object and track them at each step by iteratively optimizing the importance weights assigned to these particles. The internal state being maintained is the location geographical coordinates of the user or object along with auxiliary variables, such as speed and heading.

Figure 5B:
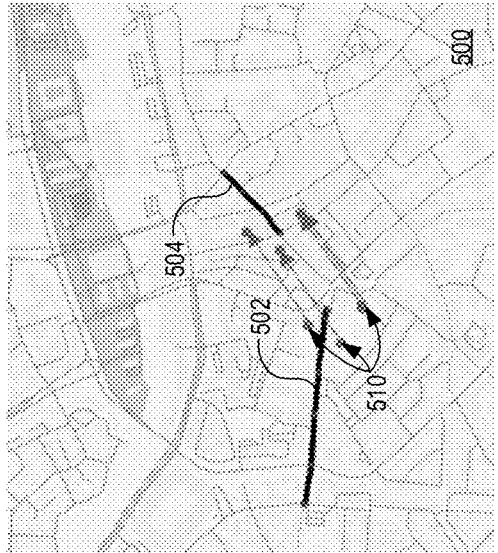

A continuous prediction algorithm, in accordance with aspects of the present disclosure, is illustrated in FIGS. 5A-5D. As described above, an anonymized trajectory along a road network 500 may include a first trajectory segment 502 and a second trajectory segment 504 separated by a gap, each segment including a sequence of geographical coordinates or observation points (FIG. 5A). To reconstruct the trajectory, the prediction algorithm may begin by randomly initializing a set of sample points, or particles 506, as internal states having geographical coordinates close to the start location of the first trajectory segment 502 (FIG. 5B). For example, the particles 506 may be within a predetermined distance from the observation point that is closest to start location of the first trajectory segment 502. The particles 506 may also be assigned weights (e.g. equal weights) reflecting their respective importance. For instance, such assigned weights may signify how close they reflect an observation, and may also be used to 'retain' the point for future time steps, as described below.

Figure 5C:
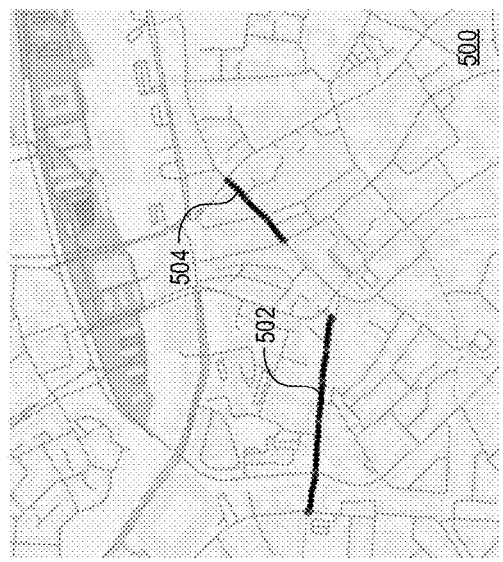

Then, for each observed point in the first trajectory segment 502, a transition 508 may be applied to predict the next observation point, which may also be the start of the second trajectory segment 504 or a new trajectory segment. That is, each observation point, corresponding to an initial state of a particle 506, may be used to predict a future state of the respective particle 506 (e.g. represented by geographical coordinates and timestamp), and such predictions may be performed for each of the particles 506. In some implementations, the transition 508 may be represented using a motion model. For instance, the transition 508 may be based on a linear model, which determines a next location as a linear function of a previous location based on a speed/heading and duration. (FIG. 5C). As a non-limiting example, a simple linear model may be used, namely: $p_1=p_0+s*t$, where $p_0$ is a point at time point 0, $p_1$ is a point at time point 1, s is the speed, and t is the time duration. The model then predicts how far a user or object would reach by traveling at speed s for time duration t. The transition 508 may be based, additionally or alternatively, on more advanced, non-linear models. To note, observations can often include errors, for instance, due to the noise in GPS readings or interference. Therefore, in some aspects, noise may be added to the particles 506 during prediction in order to mimic such errors. For example, random noise from a selected distribution may be added.

Figure 5D:
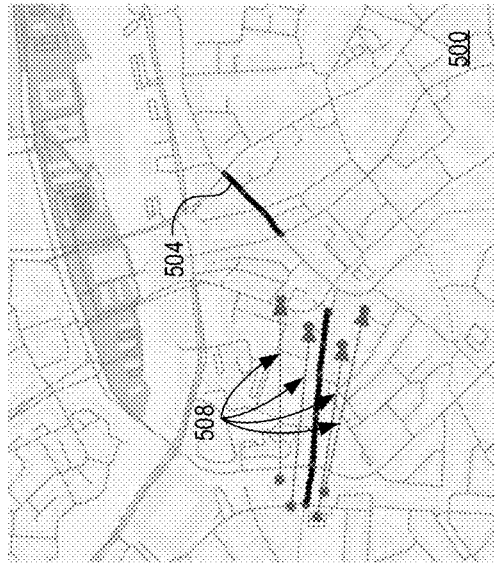

Using the observations in the first trajectory segment 502, the weights of each of the particles 506 may then be updated. A normalization may also be carried across the particles 506 to update the weights. The particles 506 may then be resampled based on the updated weights to produce resampled particles 510 (FIG. 5D). Unlikely particles 506 may be removed, ensuring that the resampled particles 510 closer to the actual observation are boosted and far-enough particles are withered-off. The resampled particles 510 may then be used to predict the location of a user or object at a future time point (e.g. determined by a gap duration), or along a trajectory or trajectory segment. In some aspects, the resampled particles 510 are weight-averaged to obtain the prediction.

Linking Trajectory Segment:

As described, split gap-based anonymization takes a trajectory and breaks it up into different trajectory segment by introducing gaps in the trajectory data. Linking trajectory segment, in accordance with aspects of the disclosure, allows for the reconstruction of such anonymized trajectory. To this end, the present prediction algorithms may, in some aspects, utilize a simple greedy approach. For instance, given an anonymized dataset that includes n trajectory segment, there are n*(n−1)/2 possible pairs of trajectory segments. However, many of these combinations may be eliminated based on certain constraints, such as timestamp, speed and location constraints. For example, a trajectory segment starting in the morning is very likely not directly related to another trajectory segment that starts in the evening. Similarly, trajectory segments belonging to different regions in a city that are far enough from one another are also likely not directly related. Once unrelated pairs are eliminated as possibilities, the remaining pairs of trajectory segments are then scored individually, as described above, and sorted. In some aspects, scores may be based on probabilities for transitioning between the end of one trajectory segment and the beginning of another trajectory segment. The pairs of trajectory segments may then be linked based on their respective scores and durations. In particular, the durations may be between the last point of a first trajectory segment and the first point of the second trajectory segment. In the case of particle filtering, scoring may be done by considering two trajectory segments as a single segment, and computing the likelihood for such single segment. In particular, using particle filter, the likelihood of particles starting from end of a first trajectory segment to reach the start of the second trajectory segment may be computed. This enhances the accuracy of the sampling-based estimate.

In some methods of anonymization, such as split-gap anonymization, a gap is introduced into a trajectory to form different trajectory segments, and the duration of such gap may be known. For instance, the gap duration may be exact or an interval. In such cases, pairs of trajectory segments may be linked if their duration is equal to, or similar to, the gap duration.

Trajectory Reconstruction:

As described, anonymized trajectories may be reconstructed by linking together trajectory segments separated, for example, by a split-gap anonymizer. The linking process may begin by generating a synthesized trajectory from two trajectory segments using their respective scores (e.g. accumulated scores). The process may then continue by linking additional trajectory segments to the end of the synthesized trajectory, until one or more predetermined conditions or constraints are satisfied. For example, the linking process may continue until the entire anonymized dataset is processed. To note, in some cases, it may not possible to process the entire anonymized dataset, owing to data sparsity. And so, in some aspects, the linking process may stop when the data becomes insufficient or sparse.

Alternatively, or additionally, the linking process may stop or continue based on a predetermined threshold. For instance, in some implementations, the linking process may be controlled by keeping track of a cumulative score for the synthesized trajectory. In particular, such cumulative score may be computed by summing the individual scores associated with each of the trajectory segments forming the synthesized trajectory. The linking process may then stop when the cumulative score is above, equal to, or below a predetermined value.

In some implementations, a minimum description length (MDL) may be alternatively, or additionally, used to control the linking process. MDL is a theoretical measure of information, which can be defined as the amount of information required to describe a set of observations given a model that describes the observations along with the model. Hence it is a sum that depends on two factors, namely the likelihood of observations following a model and the model complexity. As described, the present state-space model may be governed by the transition probabilities used to score the trajectory segments, and model complexity increases with every segment trajectory being appended to the synthesized trajectory. Hence considering the average log-likelihood of trajectory segments that are being stitched ($\Sigma L(t_1, t_2)/n$) as a criterion is a good. Intuitively, it allows assembly of the synthesized trajectory until the incremental increase in complexity is justified by a lower likelihood score.

In this case, the synthesized trajectory may be assembled by initializing an MDL score $M_0$ to zero. At stitching step i, the highest scoring trajectory segment is linked to the and synthesized trajectory S. An updated MDL score, $M_i$, may be computed using: $M_i = (L(S, T_i) + M_{i-1})/i$. If the updated MDL score is greater than a threshold, namely $M_i > M_{thres}$, the process proceeds to the next iteration, i+1. Otherwise, the linking process is stopped, and the synthesized trajectory is returned, for example, in a report.

Figure 6:
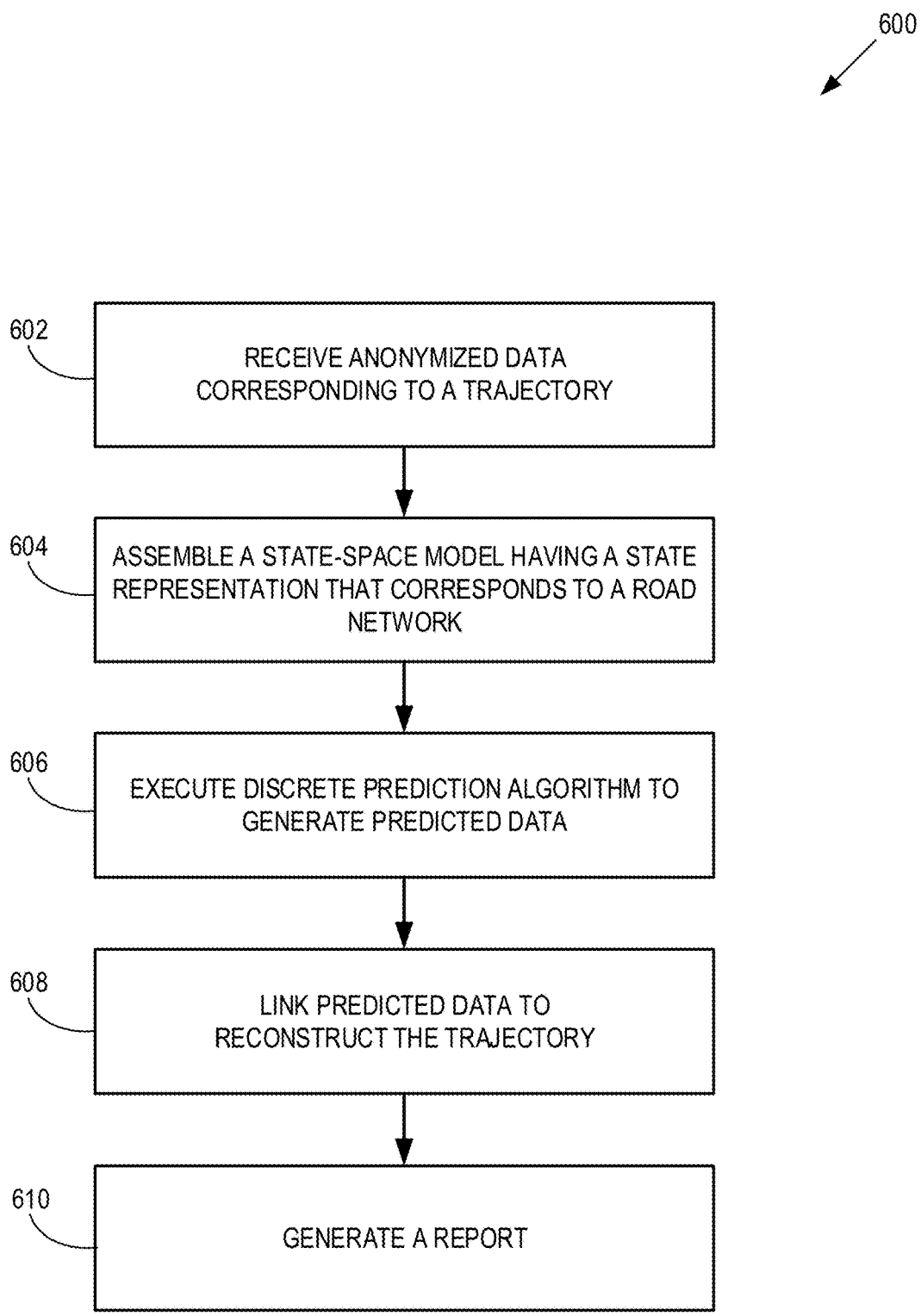
FIG. 6 is a flowchart setting forth steps of a process, in accordance with aspects of the present disclosure.

Referring particularly to FIG. 6, a flowchart setting forth steps of a process 600, in accordance with aspects of the present disclosure, is shown. Steps of the process 600 may be carried out using any combination of suitable devices or systems, as well as using systems described in the present disclosure. In some embodiments, steps of the process 600 may be implemented as instructions stored in non-transitory computer readable media, as a program, firmware or software, and executed by a general-purpose, programmed or programmable computer, processer or other computing device. In other embodiments, steps of the process 600 may be hardwired in an application-specific computer, processer, dedicated system, or module, as described with reference to FIGS. 2 and 3. Although the process 600 is illustrated and described as a sequence of steps, it is contemplated that the steps may be performed in any order or combination, and need not include all of the illustrated steps.

The process 600 may begin at process block 602 with receiving anonymized data corresponding to a trajectory of a user or object along a road network. As described, the anonymized data may include location data that is anonymized (e.g. using a split-gap anonymization technique) to protect user or object privacy. The data may be provided by or accessed from, for example, a database 107, a vehicle 105, or a content provider 111, as described with reference to FIG. 2, as well as from elsewhere (e.g. a memory, server, and so forth). Upon receipt, the data may be processed in any number of ways. For instance, the anonymized data may be map matched to a road network, where the map may include a number of links and nodes, as well as other attributes or features.

Then, at process block 604, a state-space model may be assembled based on the anonymized data. As described, in some aspects, the state-space model may have a state representation that corresponds to the road network to which the anonymized data is map matched. Based on the assembled state-space model, a discrete prediction algorithm may then be executed to generate predicted data from the anonymized data, as indicated by process block 606.

The discrete prediction algorithm may generate the predicted data (e.g. a subsequent trajectory segment) by determining a maximum distance that is reachable from a given trajectory segment in the anonymized data. As described, the maximum distance may be determined using the speed profile of the user or object and a predetermined future time point. The algorithm may also use the anonymized data to generate probability scores, where the probability scores correspond to the likelihood of transition between different links on the road network. In some aspects, the probability scores may be estimated by using a combination of probe data, road map data, and historical data. Furthermore, the algorithm may filter out links within a region of the road network defined by the maximum distance.

The predicted data may then be linked to reconstruct the trajectory of the user or object, as indicated by process block 608. As described, linking trajectory segments may be based on certain constraints, such as timestamp, speed and location constraints. Once unrelated pairs are eliminated as possibilities, the remaining pairs of trajectory segments are then scored individually and sorted. The pairs of trajectory segments may then be linked based on their respective scores and their respective durations. In some aspects, reconstruction may be performed based on cumulative score for the trajectory being linked. Reconstruction may be performed iteratively until a predetermined threshold is reached or a condition is met.

A report may then be generated, as indicated by process block 610. The report may be in any form, and provide various information. In some implementations, the report may be in the form of visual and/or audio signals, images, tabulated information and data, instructions, and combinations thereof. The report may be communicated to a user or operator by way of a display, speakers, or other means of output, a database, as well as to various devices or systems for further steps, analysis or processing. In some aspects, the report may be provided in real-time (e.g. in a time substantially corresponding to the time data of data capture and/or processing). The report, and various data and information therein, may also be stored (e.g. in a memory, a database, a server, and so forth). In some aspects, data and information provided in the report may be used to control mapping information inaccuracies. That is, based on the quality of terrestrial data, various mapping information derived therefrom may be appropriately considered (e.g. updated, corrected, and so forth).

For instance, the report may include, various predictions for locations, trajectories or trajectory segments of a user or object, as well as confidence values, uncertainties, or probability scores corresponding to such locations, trajectories or trajectory segments. In some aspects, the report may also indicate the quality or efficiency of data anonymization by way of various indices or metrics indicative of, for example, the rate of success or accuracy for reconstructing the anonymized data.

Figure 7:
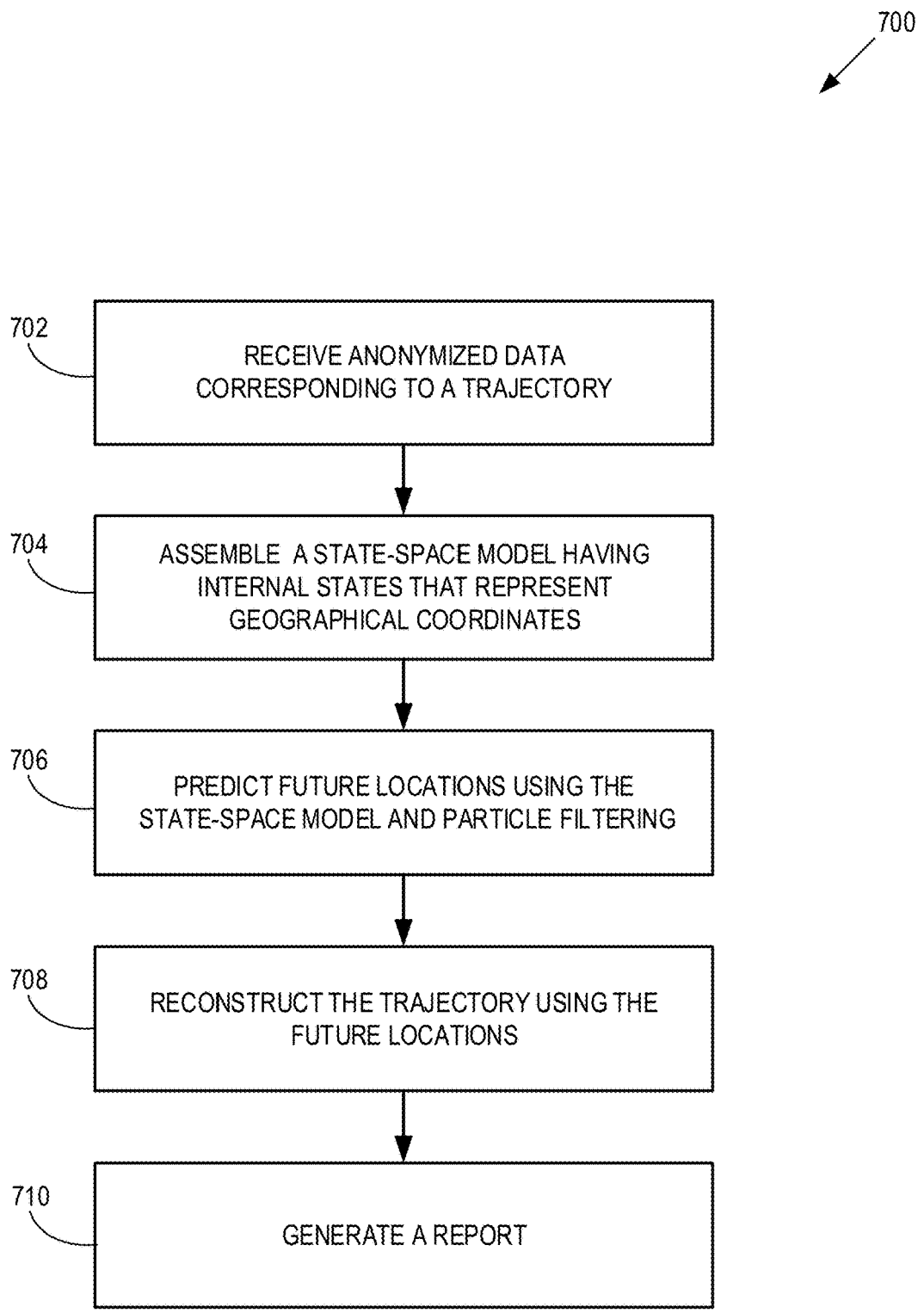
FIG. 7 is another flowchart setting forth steps of another process, in accordance with aspects of the present disclosure.

Turning now to FIG. 7, another flowchart setting forth steps of a process 700, in accordance with aspects of the present disclosure, is shown. As described above, steps of the process 700 may be carried out using any combination of suitable devices or systems, as well as using systems described in the present disclosure. In some embodiments, steps of the process 700 may be implemented as instructions stored in non-transitory computer readable media, as a program, firmware or software, and executed by a general-purpose, programmed or programmable computer, processer or other computing device. In other embodiments, steps of the process 700 may be hardwired in an application-specific computer, processer, dedicated system, or module, as described with reference to FIGS. 2 and 3. Although the process 700 is illustrated and described as a sequence of steps, it is contemplated that the steps may be performed in any order or combination, and need not include all of the illustrated steps.

The process 700 may begin at process block 702 with receiving anonymized data corresponding to a trajectory traversed by a user or object. In some aspects, the trajectory is traversed along a road network. As described, anonymized data may include location data that is anonymized to protect user or object privacy. In some aspects, the data may be anonymized by dividing the trajectory traversed into a number of trajectory segments, and introducing one or more predefined gaps by removing some of the trajectory segments. The data may be provided by or accessed from, for example, a database 107, a vehicle 105, or a content provider 111, as described with reference to FIG. 2, as well as from elsewhere (e.g. a memory, server, and so forth). Upon receipt, the data may be processed in any number of ways.

Then, at process block 704, a state-space model may be assembled based on the anonymized data. As described, the state-space model may have internal states that represent geographical coordinates of the trajectory. Based on the assembled state-space model, future locations of a user or object may then be predicted for selected trajectory segments associated with the anonymized data, as indicated by process block 706.

As described, this step may include executing a continuous prediction algorithm which randomly initializes a set of particles corresponding to a selected trajectory segment (e.g. FIG. 5B). Initial weights corresponding to the particles may then be assigned, and a transition applied (e.g. FIG. 5C). In some aspects, the transition may be represented using a linear model or a non-linear model. Once initialized, the weights of the set of particles may be updated, and the particles resampled based on the updated weights. The resampled particles may then be used to predict a future location of the user or object at a future time point. The step may be repeated a number of times to predict multiple future locations of the user or object. In some aspects, a sampling-based approach may be used, such as the SIR.

Then, at process block 708, the trajectory may then be reconstructed based on the determined future locations. To this end, a linking process may be carried out to generate a synthesized trajectory representing the reconstructed trajectory. As described, the process may begin by linking two trajectory segments, iteratively adding additional trajectory segments to the synthesized trajectory until a predetermined threshold is reached or a condition is met. In some aspects, linking trajectory segments may be based certain constraints, such as timestamp, speed and location constraints, as well as probability scores, as described.

A report may then be generated, as indicated by process block 610. The report may be in any form, and provide various information. In some implementations, the report may be in the form of visual and/or audio signals, images, tabulated information and data, instructions, and combinations thereof. The report may be communicated to a user or operator by way of a display, speakers, or other means of output, a database, as well as to various devices or systems for further steps, analysis or processing. In some aspects, the report may be provided in real-time (e.g. in a time substantially corresponding to the time data of data capture and/or processing). The report, and various data and information therein, may also be stored (e.g. in a memory, a database, a server, and so forth). In some aspects, data and information provided in the report may be used to control mapping information inaccuracies. That is, based on the quality of terrestrial data, various mapping information derived therefrom may be appropriately considered (e.g. updated, corrected, and so forth).

For instance, the report may include, various predictions for locations, trajectories or trajectory segments of a user or object, as well as confidence values, uncertainties, or probability scores corresponding to such locations, trajectories or trajectory segments. In some aspects, the report may also indicate the quality or efficiency of data anonymization by way of various indices or metrics indicative of, for example, the rate of success or accuracy for reconstructing the anonymized data.

Figure 8:
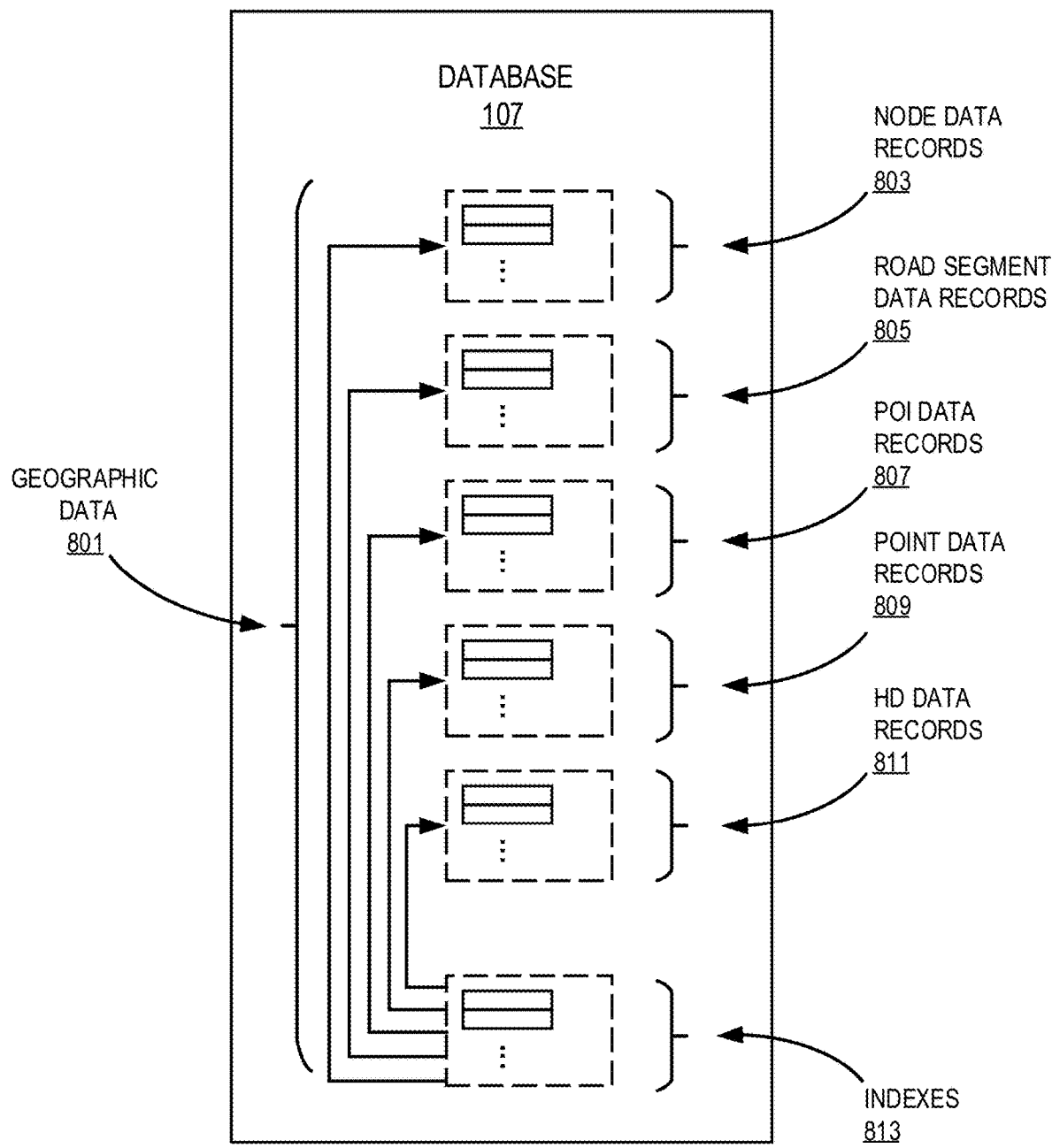
FIG. 8 is a schematic diagram of a database, in accordance with aspects of the present disclosure.

Turning now to FIG. 8, a diagram of a database 107, according to aspects of the present disclosure, is shown. As shown, the database 107 may include a variety of geographic data 801 tabulated in various arrangements, and used in various applications. For example, the geographic data 801 may be used for (or configured to be compiled to be used for) mapping and/or navigation-related services. As shown in FIG. 8, the geographic data 801 may include node data records 803, road segment data records 805, point of interest (POI) data records 807, point data records 809, high definition (HD) mapping data records 811, and indexes 813, for example. The geographic data8 may include more, fewer or different data records. In some embodiments, additional data records not shown in FIG. 8 may also be included, such as cartographic ("carto") data records, routing data records, maneuver data records, and other data records.

In particular, the HD mapping data records 811 may include a variety of data, including data with resolution sufficient to provide centimeter-level or better accuracy of map features. For example, the HD mapping data may include data captured using LiDAR, or equivalent technology capable large numbers of 3D points, and modeling road surfaces and other map features down to the number lanes and their widths. In one embodiment, the HD mapping data (e.g., HD data records 811) capture and store details such as the slope and curvature of the road, lane markings, roadside objects such as sign posts, including what the signage denotes. By way of example, the HD mapping data enable highly automated vehicles to precisely localize themselves on the road.

In some implementations, geographic features (e.g., two-dimensional or three-dimensional features) may be represented in the database 107 using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the database 107:

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In some implementations, certain conventions or rules may be followed in the database 107. For example, links may not cross themselves or each other except at a node. In another example, shape points, nodes, or links may not be duplicated. In yet another example, two links that connect each other may have a common node. In the database 107, overlapping geographic features are represented by overlapping polygons. When polygons overlap, the boundary of one polygon crosses the boundary of the other polygon.

In the database 107, the location at which the boundary of one polygon intersects the boundary of another polygon may be represented by a node. In one embodiment, a node may be used to represent other locations along the boundary of a polygon than a location at which the boundary of the polygon intersects the boundary of another polygon. In one embodiment, a shape point may not be used to represent a point at which the boundary of a polygon intersects the boundary of another polygon.

In exemplary embodiments, the road segment data records 805 may be links or segments representing roads, streets, or paths, as can be used in the calculated route or recorded route information for determination of one or more personalized routes. The node data records 803 may be end points corresponding to the respective links or segments of the road segment data records 805. The road link data records 805 and the node data records 803 may represent a road network, as used by vehicles, cars, and/or other entities, for instance. Alternatively, the database 107 may contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographical coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 107 can include data about the POIs and their respective locations in the POI data records 807. The database 107 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

As shown in FIG. 8, the database 107 may also include point data records 809 for storing the point data, learnable map features, as well as other related data used according to the various embodiments described herein. In addition, the point data records 809 can also store ground truth training and evaluation data, machine learning models, annotated observations, and/or any other data. By way of example, the point data records 809 can be associated with one or more of the node records 803, road segment records 805, and/or POI data records 807 to support localization or visual odometry based on the features stored therein and the corresponding estimated quality of the features. In this way, the records 809 can also be associated with or used to classify the characteristics or metadata of the corresponding records 803, 805, and/or 807.

As discussed above, the HD mapping data records 811 may models of road surfaces and other map features to centimeter-level or better accuracy. The HD mapping data records 811 may also include models that provide the precise lane geometry with lane boundaries, as well as rich attributes of the lane models. These rich attributes may include, but are not limited to, lane traversal information, lane types, lane marking types, lane level speed limit information, and/or the like. In one embodiment, the HD mapping data records 811 may be divided into spatial partitions of varying sizes to provide HD mapping data to vehicles and other end user devices with near real-time speed without overloading the available resources of these vehicles and devices (e.g., computational, memory, bandwidth, etc. resources).

In some implementations, the HD mapping data records 811 may be created from high-resolution 3D mesh or point-cloud data generated, for instance, from LiDAR-equipped vehicles. The 3D mesh or point-cloud data may be processed to create 3D representations of a street or geographic environment at centimeter-level accuracy for storage in the HD mapping data records 511.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

The database 107 may be maintained by content provider in association with a services platform (e.g., a map developer), as described with reference to FIG. 2. The map developer can collect data to generate and enhance the database 107. The data may be collected in various ways by the map developer, including obtaining data from other sources, such as municipalities or respective geographic authorities. In addition, the map developer can employ field personnel to travel by vehicle along roads throughout the geographic area of interest to observe features and/or record information about them, for example. Also, remote sensing, such as aerial or satellite photography, can be used.

In some implementations, the database 107 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, data may be compiled (such as into a platform specification format (PSF) format) to organize and/or configure the data for performing navigation-related functions and/or services, such as route calculation, route guidance, map display, speed calculation, distance and travel time functions, and other functions, by a navigation device of a vehicle, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The indexes 813 in FIG. 8 may be used improve the speed of data retrieval operations in the database 107. Specifically, the indexes 813 may be used to quickly locate data without having to search every row in the geographic database 107 every time it is accessed. For example, in one embodiment, the indexes 813 can be a spatial index of the polygon points associated with stored feature polygons.

Figure 9:
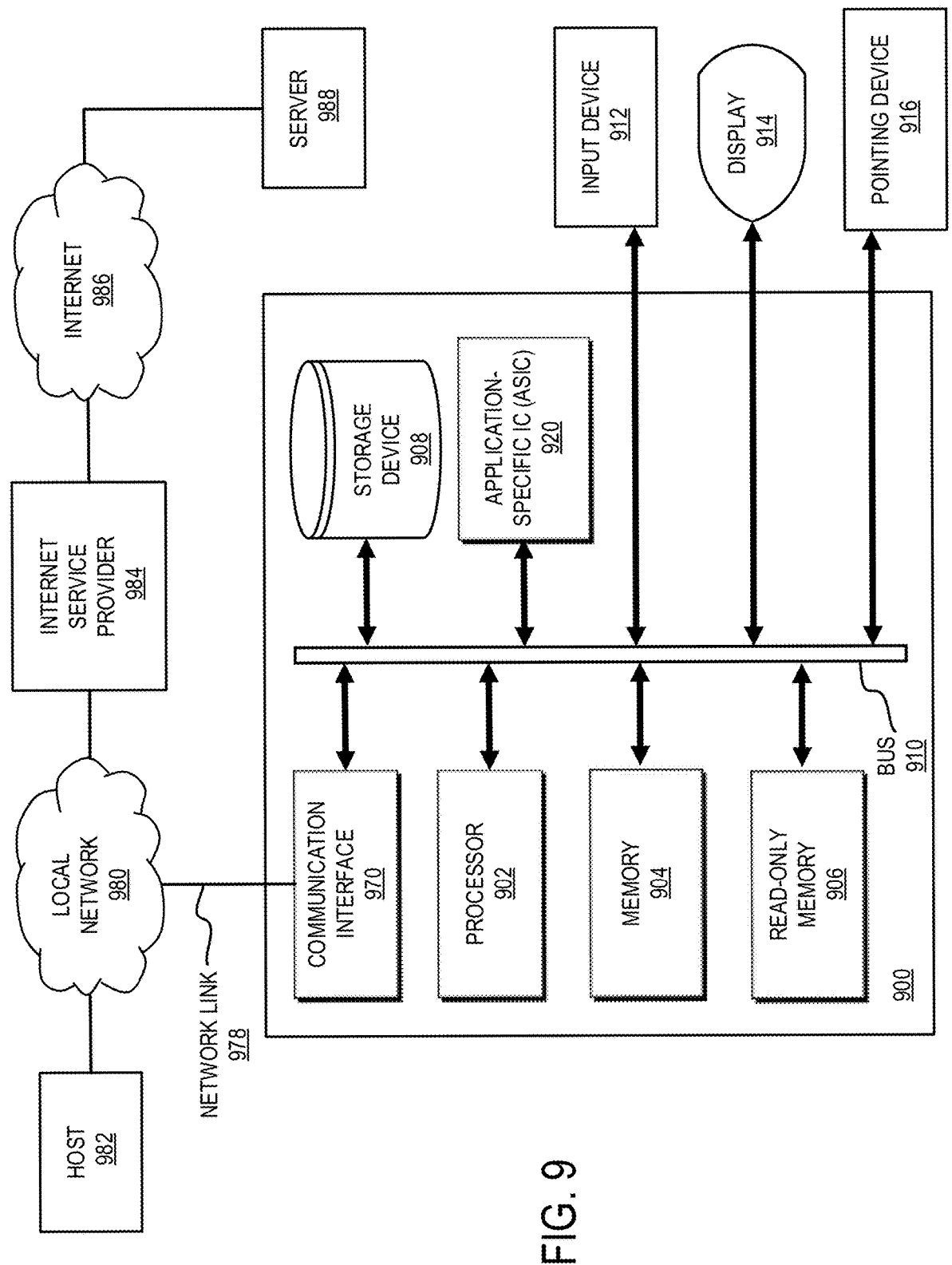
FIG. 9 is schematic diagram of an example computer system, in accordance with aspects of the present disclosure.

An example computer system 900, in accordance with aspects of the present disclosure, is illustrated in FIG. 9. The computer system 900 may be programmed (e.g., via computer program code or instructions) to perform a variety of steps, including steps for reconstructing a trajectory from anonymized data, in accordance with methods described herein.

As shown in FIG. 9, the computer system 900 may generally include a processor 902, which may be configured to perform a set of operations on information as specified by computer program code. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). In some aspects, the set of operations may include bringing information in from a bus 910 and placing information on the bus 910. The set of operations may also include comparing two or more units of information, shifting positions of units of information, and combining two or more units of information, such as by addition or multiplication or logical operations like OR, exclusive OR (XOR), and AND. Each operation of the set of operations performed by the processor 902 may be represented to the processor 902 by information called instructions, such as an operation code of one or more digits. The sequence of operations to be executed by the processor 902, such as a sequence of operation codes, constitute processor 902 instructions, may also be called computer system 900 instructions or, simply, computer instructions. The processor 902 may include multiple processors, units or modules, and may be implemented as mechanical, electrical, magnetic, optical, chemical or quantum components, among others, or any combination thereof.

As shown in FIG. 9, the computer system 900 may also include a memory 904 coupled to bus 910. The memory 904, such as a random-access memory (RAM) or other dynamic storage device, may be configured to store a variety of information and data, including processor instructions for carrying steps in accordance with aspects of the disclosure. Dynamic memory allows information stored therein to be changed by the computer system 900. The RAM allows a unit of information stored at a location called a memory address to be stored and retrieved independently of information at neighboring addresses. The memory 904 may also be used by the processor 902 to store temporary values during execution of processor instructions.

The computer system 900 may also include a read-only memory (ROM) 906, or other static storage device, coupled to the bus 910. The ROM 906 may be configured for storing static information, including instructions, that is not changed by the computer system 900. Some memory 904 includes volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

As mentioned, the bus 910 may be configured for passing information and data between internal and external components of the computer system 900. To do so, the bus 910 may include one or more parallel conductors that facilitate quick transfer of information and data among the components coupled to the bus 910. The information and data may be represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, may represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, analog data may be represented by a near continuum of measurable values within a particular range.

Information, including instructions for reconstructing a trajectory from anonymized data, may be provided to the bus 910 for use by the processor 902 from an external input device 912, such as a keyboard or a sensor. The sensor may be configured to detect conditions in its vicinity and transform those detections into physical expression compatible with the measurable phenomenon used to represent information in computer system 900. Other external devices coupled to bus 910, used primarily for interacting with humans, may include a display device 914, such as a cathode ray tube (CRT) or a liquid crystal display (LCD), or plasma screen or printer for presenting text or images, as well as a pointing device 916 (e.g. a mouse, trackball, cursor direction keys, motion sensor, and so forth) for controlling a position of a small cursor image presented on the display 914 and issuing commands associated with graphical elements presented on the display 914. In some embodiments, for example, the computer system 900 performs all functions automatically without human input. As such, one or more of external input device 912, display device 914 and pointing device 916 may be omitted.

As shown in FIG. 9, special purpose hardware, such as an application specific integrated circuit (ASIC) 920, may be coupled to bus 910. The special purpose hardware may be configured to perform specialized operations. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 900 may also include one or more instances of a communications interface 970 coupled to bus 910. The communication interface 970 may provide a one-way or two-way communication coupling to a variety of external devices that operate with their own processors, such as printers, scanners and external disks. In addition, the communication interface 970 may provide a coupling to a local network 980, by way of a network link 978. The local network 980 may provide access to a variety of external devices and systems, each having their own processors and other hardware. For example, as shown in FIG. 9, the network link 978 can communicate with a local network 980, which may be in communication with a host 982 and/or internet service provider (ISP) 984. In turn, the ISP 984 may communicate with a remote server 988 via the internet 986.

By way of example, the communication interface 970 may include a parallel port or a serial port or a universal serial bus (USB) port on a personal computer. In some embodiments, the communications interface 970 may include one or more integrated services digital network (ISDN) cards, or digital subscriber line (DSL) cards, or telephone modems that provides an information communication connection to a corresponding type of telephone line. In some embodiments, the communication interface 970 may include a cable modem that converts signals on bus 910 into signals for a communication connection over a coaxial cable or into optical signals for a communication connection over a fiber optic cable. As another example, the communications interface 970 may be a local area network (LAN) card configured to provide a data communication connection to a compatible LAN, such as Ethernet. Wireless links may also be implemented. For wireless links, the communications interface 970 may send and/or receive electrical, acoustic or electromagnetic signals, including infrared and optical signals, that carry information streams, including digital data. For example, in wireless handheld devices (e.g. mobile telephones, cell phones, and so forth), the communications interface 970 may include a radio band electromagnetic transmitter and receiver called a radio transceiver. In certain embodiments, the communications interface 970 enables connection to the communication network, as described with reference to FIG. 2.

As used herein, computer-readable media refers to any media that participates in providing information to processor 902, including instructions for execution. Such media may take many forms, and include non-volatile media, volatile media, transmission media, and others. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 10:
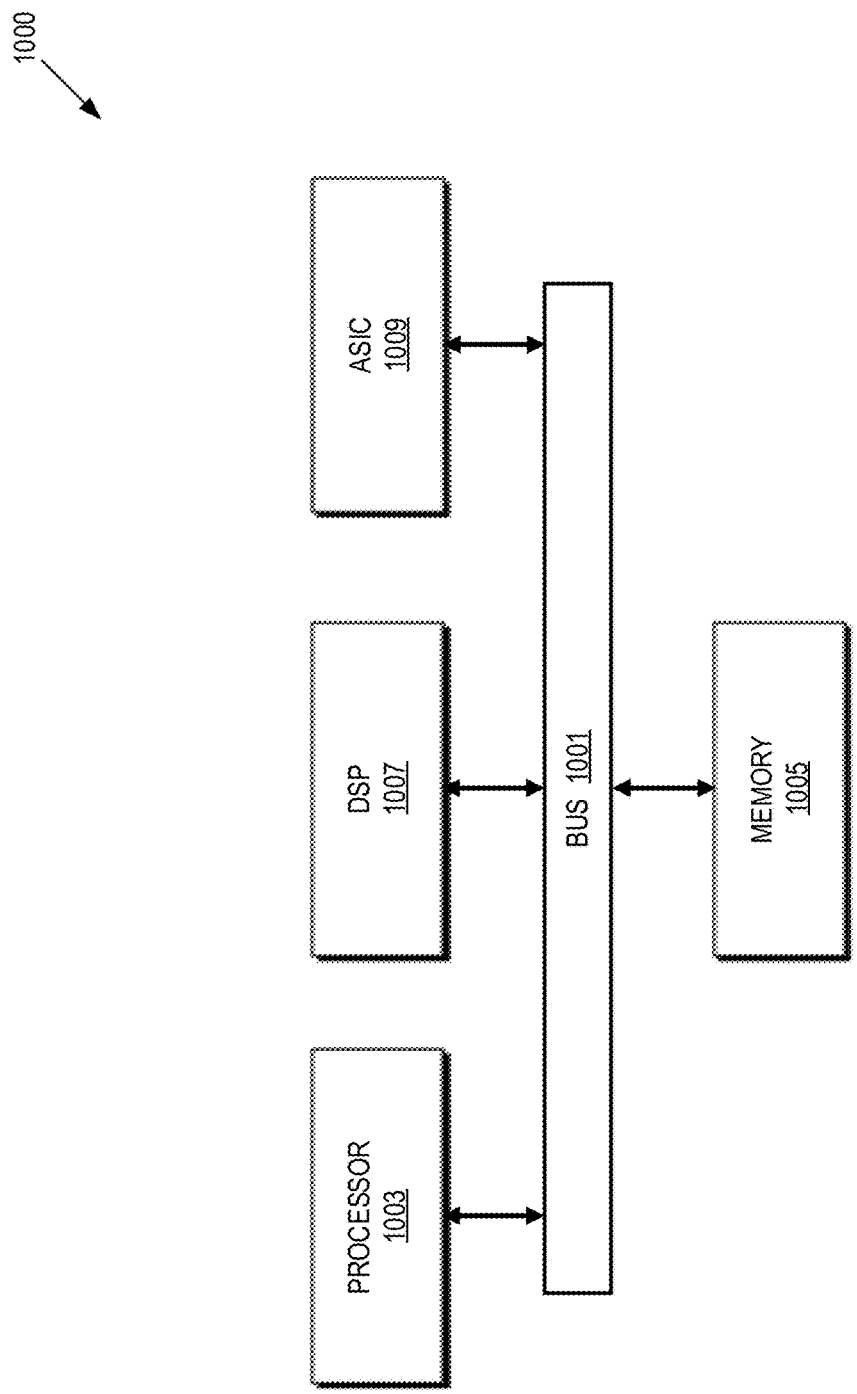
FIG. 10 is a schematic diagram of an example chip set, in accordance with aspects of the present disclosure.

Turning now to FIG. 10, a chip set 1000, in accordance with aspects of the present disclosure, is illustrated. In some implementations, the chip set 1000 may be programmed to carry out steps in accordance with methods described herein, and may include various components (e.g. as described with respect to FIG. 9) incorporated in one or more physical packages (e.g., chips). By way of example, a physical package includes an arrangement of one or more materials, components, and/or wires on a structural assembly (e.g., a baseboard) that provides one or more characteristics, such as physical strength, conservation of size, and/or limitation of electrical interaction. It is contemplated that in certain embodiments the chip set 1000 can be implemented in a single chip.

As shown, the chip set 1000 may include a communication mechanism, such as a bus 1001 for passing information and data among the components of the chip set 1000. A processor 1003 connected to the bus 1001 may be configured to execute instructions and process information stored in, for example, a memory 1005. The processor 1003 may include one or more processing cores, with each core capable of performing independently. In some implementations, a multi-core processor may be used, which enables multiprocessing within a single physical package. Examples of a multi-core processor include two, four, eight, or greater numbers of processing cores. Alternatively, or additionally, the processor 1003 may include one or more microprocessors configured in tandem, via the bus 1001, to perform independent execution of instructions, pipelining, and multithreading.

The chip set 1000 may also include specialized components configured to perform certain processing functions and tasks. For instance, the chip set 1000 may include one or more digital signal processors (DSP) 1007, or one or more application-specific integrated circuits (ASIC) 1009, or both. In particular, the DSP 1007 may be configured to process real-world signals (e.g., sound) in real time independently of the processor 1003. Similarly, the ASIC 1009 may be configured to performed specialized functions not easily performed by a general-purpose processor. Other specialized components to aid in performing the inventive functions described herein may include one or more field programmable gate arrays (FPGA) (not shown), one or more controllers (not shown), or one or more other special-purpose computer chips.

The processor 1003 and accompanying components may have connectivity to the memory 1005 via the bus 1001, as shown. The memory 1005 may include dynamic memory (e.g., RAM, magnetic disk, writable optical disk, etc.), static memory (e.g., ROM, CD-ROM, etc.), and others, configured for storing executable instructions. The instructions, when executed, perform a variety of steps, including steps for identifying the quality of terrestrial data, in accordance with methods described herein. The memory 1005 may also store the data associated with or generated by the execution.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. It should be appreciated that many equivalents, alternatives, variations, and modifications, aside from those expressly stated, are possible and may be considered within the scope of the invention.

The invention claimed is:

1. A method for reconstructing a trajectory from anonymized data, the method comprising:
   receiving anonymized data corresponding to a trajectory traversed by a user or object;
   assembling a state-space model having internal states that represent geographical coordinates of the trajectory, wherein assembling the state-space model includes randomly initializing a set of particles corresponding to a selected trajectory segment, assigning initial weights to the set of particles, applying a transition represented by a linear model or a non-linear model to the set of particles, updating the weights of the set of particles, and resampling the set of particles based on the updated weights to generate a set of resampled particles;
   for the selected trajectory segment associated with the anonymized data, predicting future locations of the user or object using the state-space model and particle filtering;
   reconstructing the trajectory using the future locations; and
   generating a report indicative of the trajectory.

2. The method of claim 1, wherein the method further comprises generating the anonymized data by dividing the trajectory into trajectory segments separated by one or more predefined gaps.

3. The method of claim 2, wherein the method further comprises characterizing, based on the trajectory, an anonymization technique used to generate the anonymized data.

4. The method of claim 1, wherein the method further comprises using the anonymized data to generate probability scores, wherein each probability score corresponding to a likelihood of transition between different trajectory segments.

5. The method of claim 1, wherein the method further comprises applying a Sequential Importance Resampling (SIR) in predicting the future locations of the user or object.

6. The method of claim 1, wherein the method further comprises reconstructing the trajectory by linking together at least two trajectory segments based on scores and durations of the segment trajectories.

7. A system for reconstructing a trajectory from anonymized data, the system comprising:
   at least one processor;
   at least one memory comprising instructions executable by the at least one processor, the instructions causing the system to:
      receive anonymized data corresponding to a trajectory traversed by a user or object;
      assemble a state-space model having internal states that represent geographical coordinates of the trajectory, wherein the instructions causing the system to assemble the state-space model includes instructions that cause the system to randomly initialize a set of particles corresponding to a selected trajectory segment, assign initial weights to the set of particles, apply a transition represented by a linear model or a non-linear model to the set of particles, update the weights of the set of particles, and resample the set of particles based on the updated weights to generate a set of resampled particles;
      for the selected trajectory segment associated with the anonymized data, predict future locations of the user or object using the state-space model and particle filtering;

reconstruct the trajectory using the future locations; and
generate a report indicative of the trajectory; and
a display for providing the report.

8. The system of claim 7, wherein the instructions further cause the system to generate the anonymized data by dividing the trajectory into trajectory segments separated by one or more predefined gaps.

9. The system of claim 7, wherein the instructions further cause the system to use the anonymized data to generate probability scores, wherein each probability score corresponding to a likelihood of transition between different trajectory segments.

10. The system of claim 7, wherein the instructions further cause the system to apply a Sequential Importance Resampling (SIR) in predicting the future locations of the user or object.

11. The system of claim 7, wherein the instructions further cause the system to reconstruct the trajectory by linking together at least two trajectory segments based on scores and durations of the segment trajectories.

12. A non-transitory computer-readable storage medium for reconstructing a trajectory from anonymized data, carrying one or more sequences of one or more instructions which, when executed by one or more processors, cause an apparatus to perform steps to:

receive anonymized data corresponding to a trajectory traversed by a user or object;

assemble a state-space model having internal states that represent geographical coordinates of the trajectory, wherein the one or more sequences of one or more instructions which, when executed by the one or more processors, cause the apparatus to perform the steps to assemble the state-space model further cause the apparatus to perform steps to randomly initialize a set of particles corresponding to a selected trajectory segment, assign initial weights to the set of particles, apply a transition represented by a linear model or a non-linear model to the set of particles, update the weights of the set of particles, and resample the set of particles based on the updated weights to generate a set of resampled particles;

for the selected trajectory segment associated with the anonymized data, predict future locations of the user or object using the state-space model and particle filtering;

reconstruct the trajectory using the future locations; and
generate a report indicative of the trajectory.

* * * * *